United States Patent [19]

Cusano

[11] 4,187,427
[45] Feb. 5, 1980

[54] STRUCTURE FOR COLLIMATED SCINTILLATION DETECTORS USEFUL IN TOMOGRAPHY

[75] Inventor: Dominic A. Cusano, Schenectady, N.Y.

[73] Assignee: General Electric Company, Schenectady, N.Y.

[21] Appl. No.: 868,045

[22] Filed: Jan. 9, 1978

[51] Int. Cl.² .............................................. G01T 1/20
[52] U.S. Cl. .................................. 250/366; 250/367; 250/445 T
[58] Field of Search ................... 250/363 S, 366, 367, 250/368, 445 T, 361

[56] References Cited

U.S. PATENT DOCUMENTS

| 3,777,161 | 12/1973 | Lee | 250/367 X |
| 3,825,758 | 7/1974 | Miraldi | 250/367 X |
| 3,866,047 | 2/1975 | Hounsfield | 250/445 T X |
| 3,936,645 | 2/1976 | Iversen | 250/367 X |

Primary Examiner—Davis L. Willis
Attorney, Agent, or Firm—Lawrence D. Cutter; Marvin Snyder; Joseph T. Cohen

[57] ABSTRACT

Structures for containing and supporting scintillator bodies are disclosed in which the optical output of the scintillator body is channeled by light reflective means to photoelectrically responsive devices mounted on the top and bottom of the detector array. In accordance with one embodiment of the invention, the internal surfaces of the collimating array are coated with either a diffuse or specular reflective coating. In accordance with another embodiment of the invention, the photoelectrically responsive transducers are located at the top and bottom of the array rather than at the rear. In accordance with another embodiment of the invention, reflective light channeling wedges are provided to improve spacing requirements for the photoelectrically responsive transducers. The scintillator structures of the present invention provide superior optical coupling to photoelectrically responsive devices.

12 Claims, 9 Drawing Figures

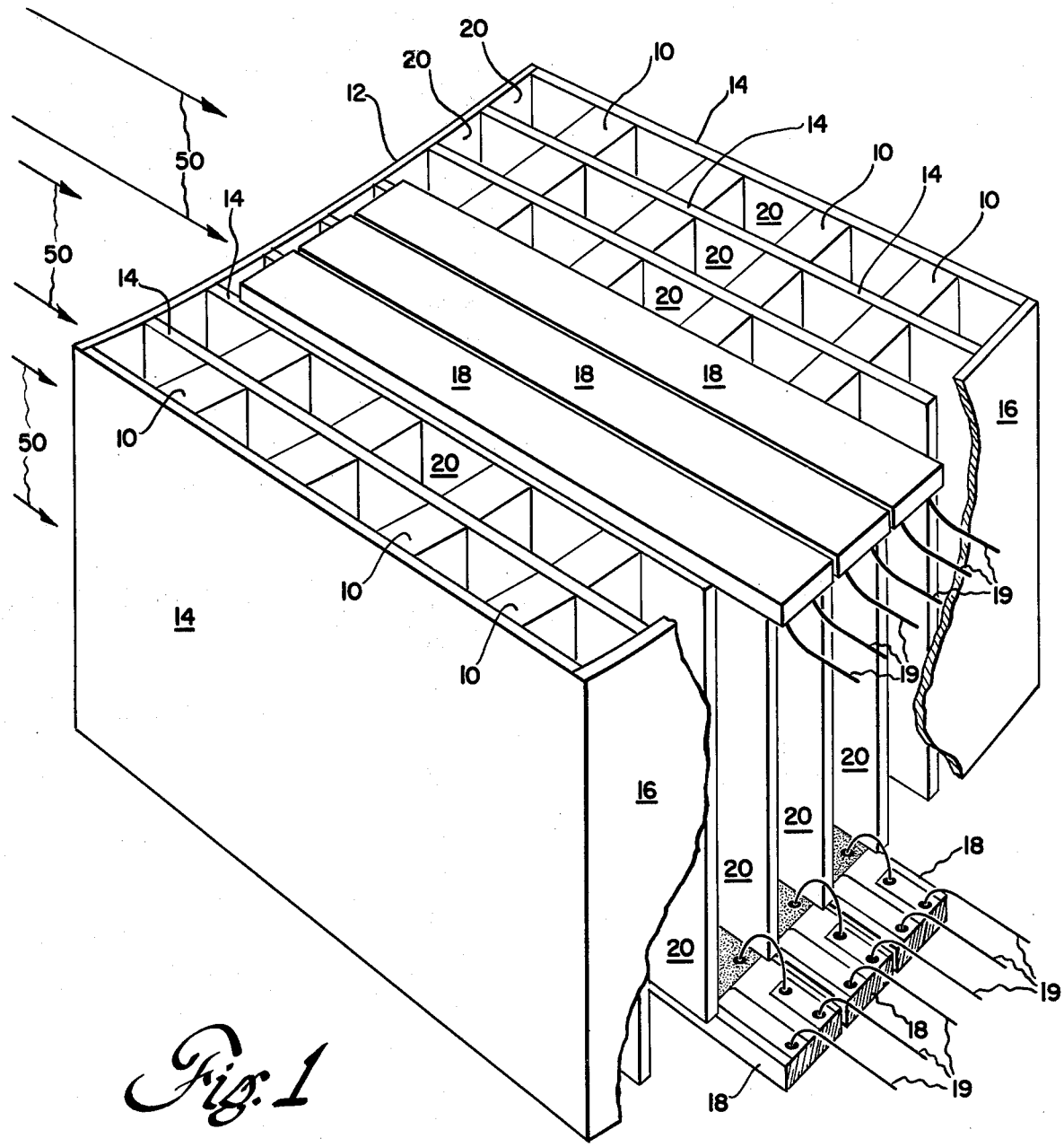

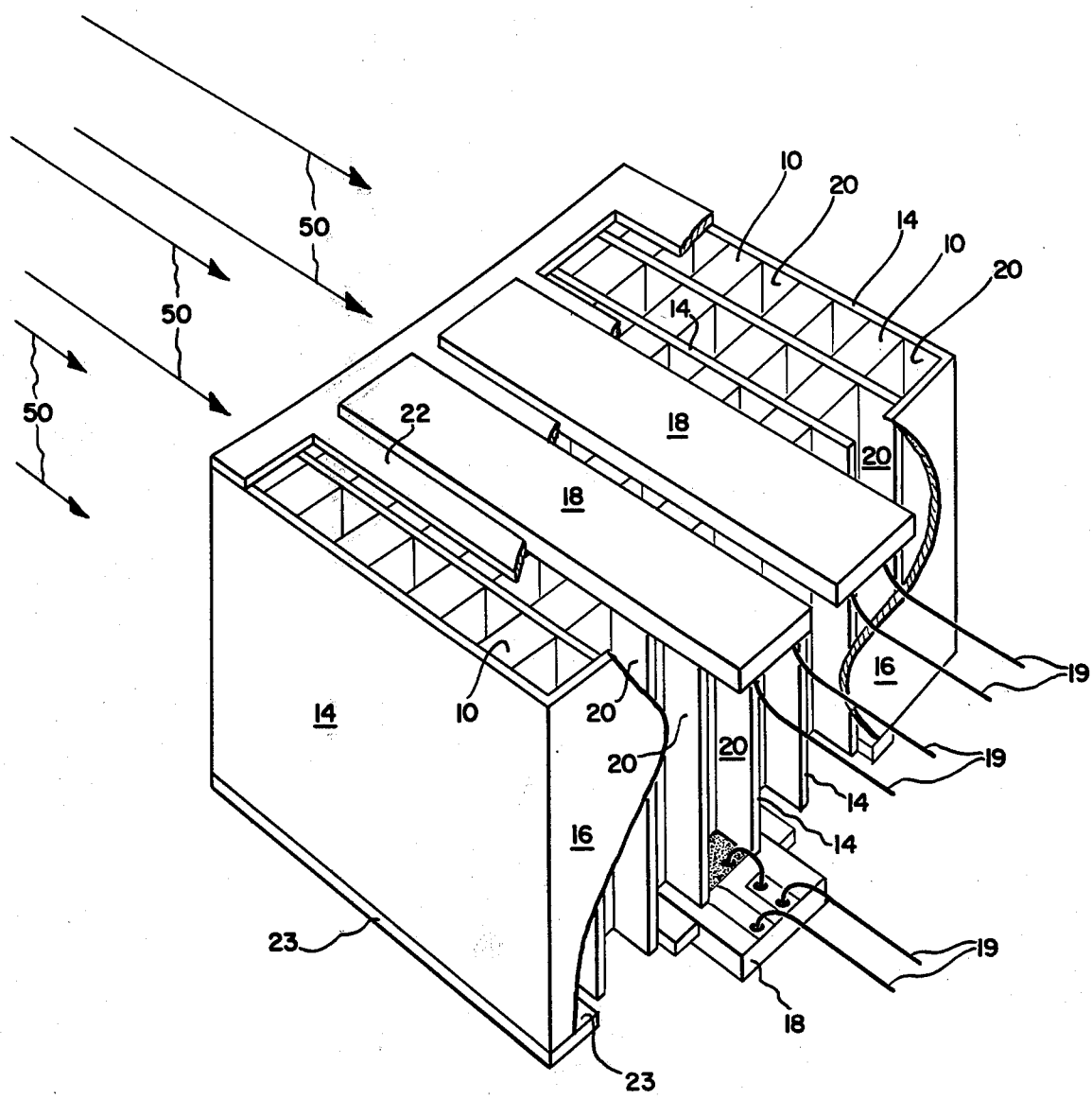

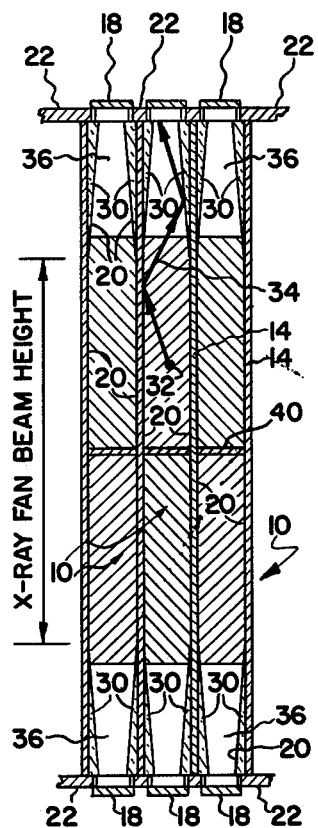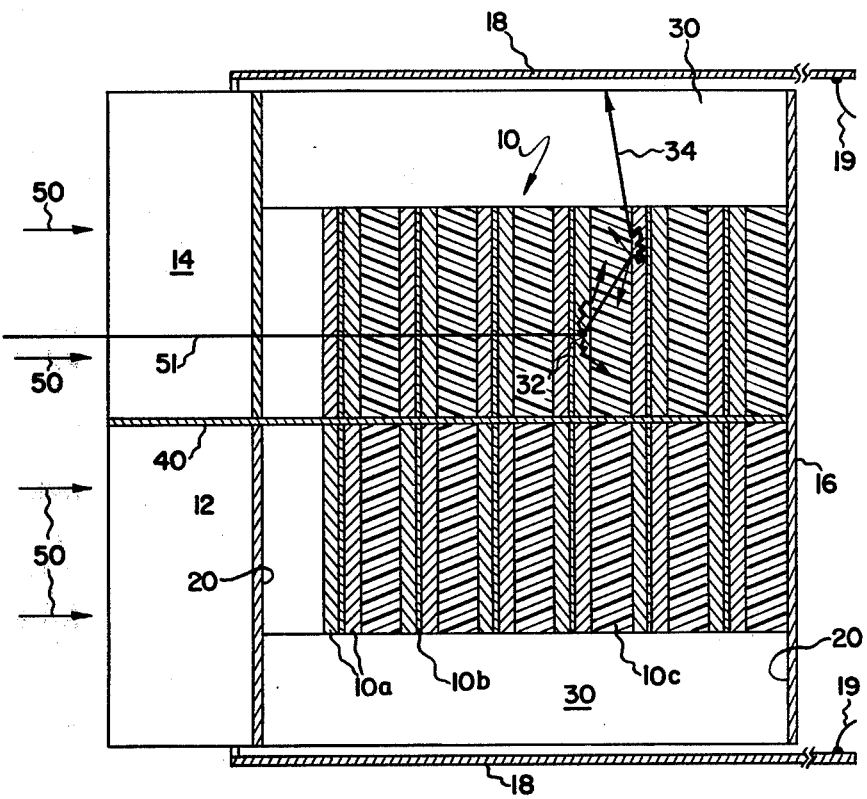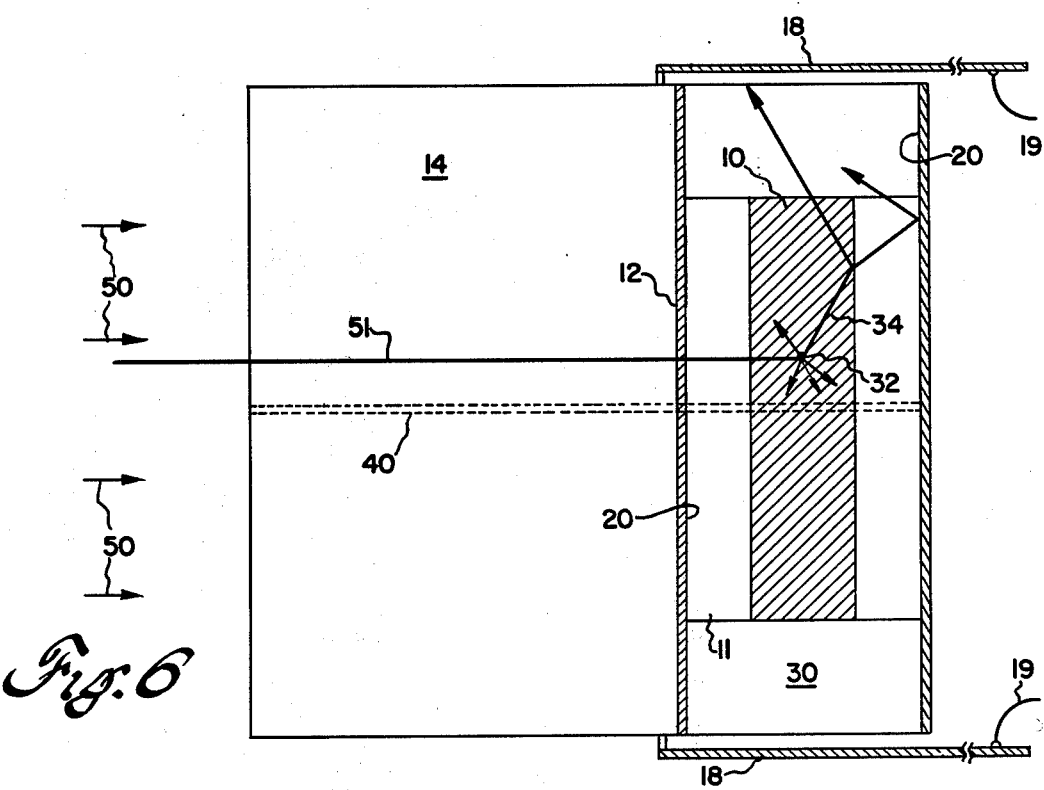

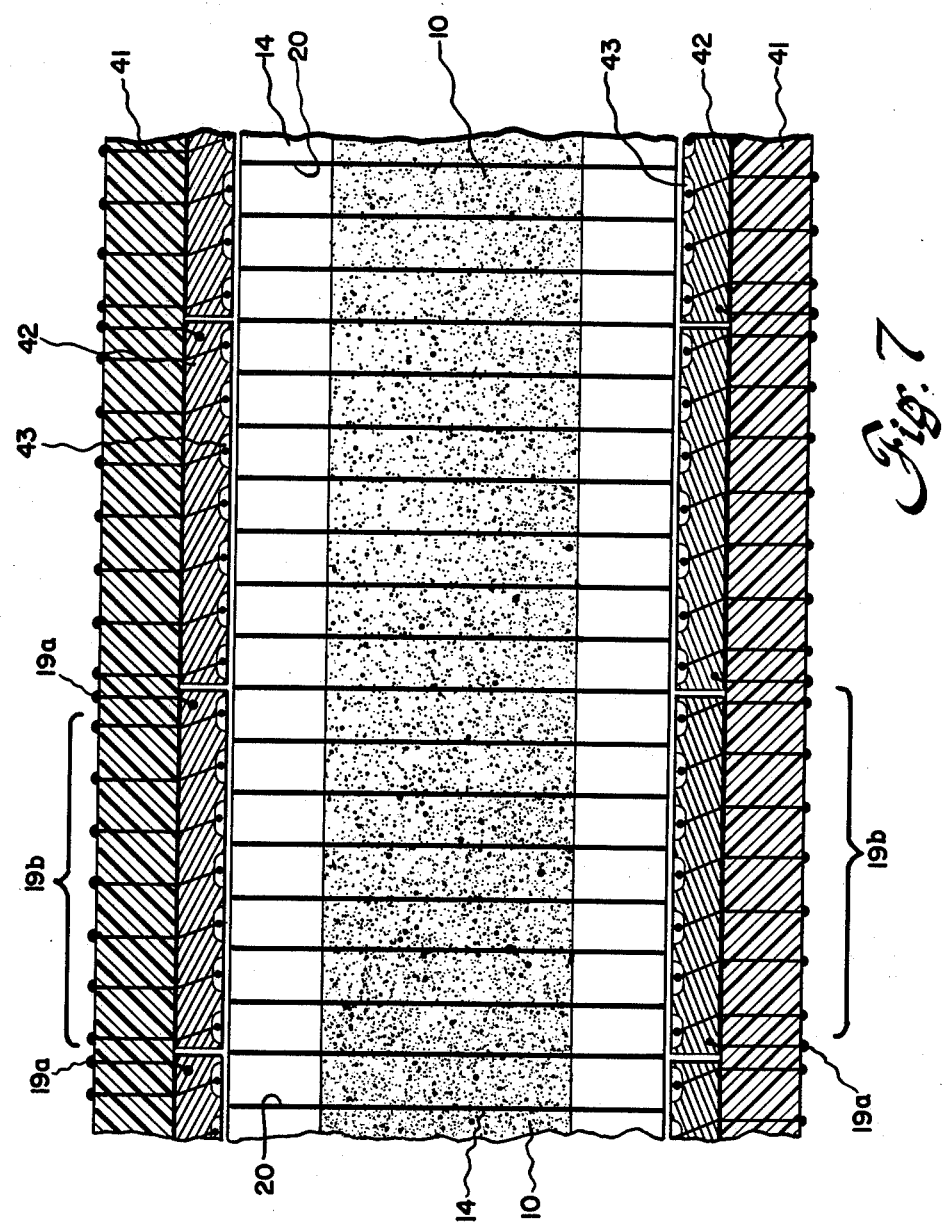

STRUCTURE FOR COLLIMATED SCINTILLATION DETECTORS USEFUL IN TOMOGRAPHY

BACKGROUND OF THE INVENTION

This invention relates to scintillation detector arrays which are useful in tomography or other related industrial applications. More particularly, this invention relates to a structure for enhancing the channeling of the optical output of a scintillator body, excited by x-ray radiation, to photoelectrically responsive devices.

A scintillator is a material which emits electromagnetic radiation in the visible or near-visible spectrum when excited by high energy electromagnetic photons such as those in the x-ray or gamma-ray regions of the spectrum, which region is hereinafter referred to as the supra-optical frequency region. Also as used herein the term "light" refers not only to the visible region of the spectrum but also to those near-visible regions which encompass the radiation emitted by certain scintillators in the infrared or ultraviolet regions. In typical tomographic or industrial applications, the light output from scintillator materials is made to impinge upon photoelectrically responsive materials in order to produce an electrical output signal which is in direct relation to the intensity of the initial x-ray or gamma-ray bombardment which has been modulated by causing the supra-optical photons to pass through the body being studied.

In general, it is desirable that the amount of light output from the scintillators be as high as possible for a given amount of x-ray or gamma-ray bombardment. This is particularly true in the medical tomography area where it is desired that the energy intensity of the x-ray be as small as possible to minimize the danger to the patient. For this reason, as large an amount as possible of the optical output of the scintillator should be directed to the photoelectrically responsive transducer.

In the past, single crystals of scintillator material, such as cesium iodide (CsI), have been proposed and used in scintillation detector arrays. Single crystals are not always available, or are too costly. Hence, scintillator bodies prepared from phosphor powders have been proposed. However, the optical opacity of these scintillator bodies has prevented an optimal amount of light from reaching the photoelectrically responsive detectors. The amount of detectable optical output has been limited to that which is generated by x-ray excitation in or near the surface regions of the scintillator body and also that optical output generated deep within the scintillator body which can escape the body albeit in an attenuated level.

However, recent inventions have produced scintillator bodies from which light escape is greatly enhanced. For example, in application Ser. No. 853,085, filed Nov. 21, 1977 by Cusano et al., which is assigned to the same assignee as this application and which is thereby incorporated herein by reference, discloses transparent scintillator bodies produced by hot-pressing and hot-forging. The transparency of these bodies permits a greater amount of optical output than occurs in opaque scintillation detectors. Also, in application Ser. No. 853,086, filed Nov. 21, 1977 filed Cusano et al. and which is assigned to the same assignee as this application and which is hereby incorporated herein by reference, there is disclosed two embodiments of a distributed phosphor scintillator structure in which the phosphor is distributed in either a continuous or a layered fashion within or between a transparent matrix material. Here too, the optical output more readily escapes the scintillator body for detection, than in the case of an opaque scintillator material. Similarly, in application Ser. No. 863,876, filed Dec. 23, 1977 filed by Cusano et al, which is assigned to the same assignee as this application and which is also hereby incorporated herein by reference, a distributed phosphor scintillator body is disclosed in which the phosphor is distributed continuously throughout a transparent matrix material which is matched to the phosphor material in its index of refraction. As discussed therein, this also further enhances the escape of optical energy from the scintillator body whereby it is more readily detected.

Another negative feature of prior scintillation detector arrays is that the photoelectrically reponsive detectors are typically mounted at the rear of the array in the direct path of the x-ray or gamma-ray beam. This is undesirable in that prolonged exposure to such bombardment of photoelectrically responsive detection devices such as silicon photodiodes results in a deterioration in their performance and efficiency. Furthermore, the detectors themselves will show response due to direct x-rays which pass through or by the edges of scintillators and cause poor channel-to-channel signal uniformity.

SUMMARY OF THE INVENTION

In accordance with one embodiment of the invention, a collimated scintillator detector structure is provided defining a series of volumes or cells which contain the scintillator bodies or material and which have their internal surfaces coated with either a diffuse or specularly reflecting material so that optical energy impinging thereon is redirected through translucent or transparent scintillator bodies, such as those described in applications Ser. Nos. 853,085; 853,086; and 863,876, from which it eventually escapes for detection. In accordance with another embodiment of the present invention, reflective, light channeling wedges are provided to provide enhance the channeling of the optical output of a scintillator body to its corresponding detector. In still another embodiment, the photoelectrically responsive detectors are mounted at the top and bottom of the scintillator detector arrays, out of the path of direct x-ray bombardment. Furthermore, the incorporation of the light channeling wedges permits an improved spacing configuration between adjacent photoelectrically responsive detectors.

Accordingly, it is an object of this invention to provide a collimated scintillator detector structure having superior optical output and placement of the photoelectrically responsive detectors outside the region of intense x-ray or gamma-ray bombardment.

DESCRIPTION OF THE DRAWINGS

FIG. 1 is a perspective drawing illustrating one embodiment of the present invention in which a pair of photoelectrically responsive detectors is associated with each scintillation cell.

FIG. 2 is a perspective drawing of one embodiment of the present invention illustrating the use of a single photoelectrically responsive detector with each scintillation cell.

FIG. 3 is a rear sectional elevation view of one embodiment of the present invention illustrating the use of light channeling wedges.

FIG. 5 is a side sectional view illustrating x-ray absorption in a multi-layered scintillator structure.

FIG. 6 is a side sectional elevation view illustrating the use of a single scintillator body.

FIG. 7 is a rear sectional elevation view illustrating one embodiment of the present invention in which the photoelectrically responsive detectors used are of a modular rather than of individual construction.

DETAILED DESCRIPTION OF THE INVENTION

Figure 4:
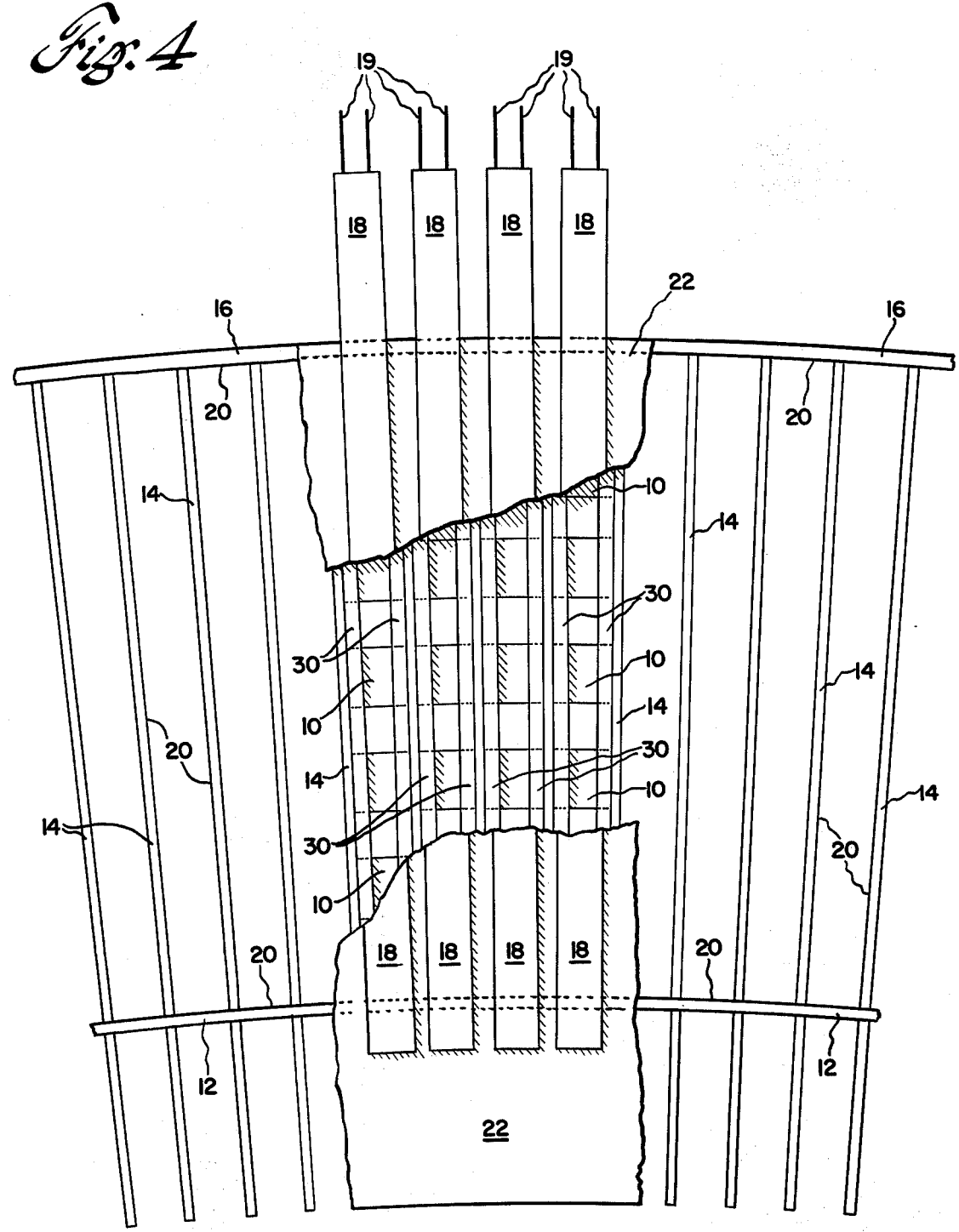
FIG. 4 is a sectional plan view of the embodiment shown in FIG. 3 further illustrating the location of the light channeling wedges and the photoelectrically responsive detectors.

FIG. 1 illustrates a collimated scintillator detector array structure in accordance with one embodiment of the present invention. In this structure, collimator members 14, front wall member 12, and rear wall member 16 define a series of volumes into which a variety of scintillator bodies 10 may be placed. The scintillator bodies may comprise any of the structures and materials described in application Ser. Nos. 853,085; 853,086; and 863,876. The front wall member 12 is comprised of a material which is highly nonabsorptive of x-ray or gamma-ray radiation. Appropriate materials for front wall member 12 include aluminum, beryllium, quartz, plastics, or other low Z materials. On the other hand, collimator members 14 are comprised of high Z materials such as tungsten, tantalum, or molybdenum. The material used for rear wall members 16 is not critical, but it may if desired be chosen to be a material which is highly impervious to x-ray or gamma-ray radiation so that any residual, nonabsorbed radiation energy is prevented from escaping to the surrounding environment. Wall members and collimator members 12, 14, and 16 however, are formed from a rigid material. Prior to assembly, or after, the internal surfaces of said wall and collimator members are coated with an optically reflective material so that light generated by the scintillator bodies placed within the volumes defined, is eventually directed to photoelectrically responsive detectors 18. The electrical output leads 19 of these detectors 18 are attached to a data acquisition channel (not shown) for analysis by standard computerized tomographic means. Typically, in such computerized tomographic devices, a fan shaped x-ray beam 50 is used to provide the excitation for the scintillator bodies 10. The resultant light output from the scintillator bodies 10 is reflected by the coating 20 applied to the internal surfaces of the volumes defined by the wall members 12, 14, 16.

The reflective coating 20 may be diffuse or specular. By way of example, a diffuse reflecting surface is provided by coating the interior of the wall member 12, 14, 16 with a thin coating of barium sulfate (BaSO$_4$) or magnesium oxide (MgO); but if a specular reflecting surface is desired, then the wall members 12, 14, 16 are coated with silver, for example, by evaporation. Other reflective materials may also be used but if such materials contain high Z atomic elements, then it is desirable that the thickness of such coating on front wall member 12 be kept to a minimum so that the x-ray beam 50 is not attenuated before absorption in scintillator bodies 10 occurs. The reflective material is applied, for example by either evaporation or deposition.

In the structure illustrated in FIG. 1, photoelectrically responsive detectors 18, such as silicon photodiodes, are mounted on top and on the bottom of each detector cell. These detectors 18 are carefully aligned with collimator members 14 so that no signal overlap occurs between between adjacent detector cells. If this is not done, an undesirable loss in signal resolution may occur.

The placement of the photoelectrically responsive detectors on the tops and bottoms of the detector cells is superior to prior scintillator detector array designs in which the photoelectrically responsive detector is mounted at the rear of the array in the position occupied in the present invention by rear wall member 16. The prior configuration permitted the photoelectrically responsive detectors 18 to be placed directly in the path of the x-ray or gamma-ray beam, thereby subjecting it to possible degradation effects caused by exposure to the beam energy not absorbed by the scintillator bodies 10. The present photoelectrically responsive device placement as shown in FIG. 1 not only avoids this undesirable limitation but also provides for a greater area for the detection of the optical scintillator output. As shown in FIG. 1, it can provide not only for a greater area if only one photoelectrically responsive detector per cell is used, but it also permits the placement of two such detectors per cell thereby greatly enhancing the capture of optical output.

FIG. 2 illustrates an alternative embodiment of the present invention in which there is associated with each scintillator cell only a single photoelectrically responsive detector. In this embodiment, an alternating arrangement is used thereby making the placement and alignment of detectors 18 less critical. In the embodiment shown in FIG. 2, two additional members are required, namely, an upper ceiling member 22 and lower floor member 23. These additional members 22, 23, have their internal surfaces, namely those surfaces facing the scintillator bodies, coated with an appropriate reflective substance, thereby directing the optical output to the opposite side of the structure for detection. Again the reflective coating 20 is applied either by deposition or evaporation methods.

FIG. 3 illustrates another embodiment of the present invention in which light channeling wedges 30 are employed to enhance the direction of light output onto the surface of the photoelectrically responsive detectors 18. These wedges 30 are made of any rigid material such as plastic or aluminum. The wedges are likewise coated with an optically reflective substance 20. The presence of the wedges to channel the light serves also to alleviate the critical alignment problems that may occur with photoelectrically responsive devices 18. As suggested in FIG. 3, exact alignment of the detectors 18 at the edges of collimators 14 is no longer required in this structure.

In addition, FIG. 3 shows an absorption site 32 at which an x-ray or gamma-ray photon is absorbed and converted into a multiple of lower energy optical wavelength photons. The path 34 of a typical optical wavelength photon is also shown being reflected from the coating 20 on the collimator 14 and also the coating 20 on the light channeling wedge 30 on its way to detector 18.

If it is also desired that the vertical resolution be increased, the scintillator structure is provided with a horizontal wall member 40 as shown in FIG. 3. This member is typically made from the same material as the collimators 14 and is typically coated with the same reflective material 20 as are the collimators 14 and the other wall members 12, 16, and 22. The space 36 shown in FIG. 3 is filled either with air, with a fiber optic light piping material, or other transparent medium.

FIG. 4 is a plan view of FIG. 3, more particularly describing the location of the light channeling wedges 30. The scintillator bodies illustrated in FIG. 4 are the multi-layered distributed phosphor bodies as disclosed and claimed in application Ser. No. 853,086, filed Nov. 21, 1977 of Cusano et al. Moreover FIG. 4 illustrates a structure in which the collimator members 14 extend for a distance in front of each cell thereby lessening signal crossover and improving side-to-side resolution.

FIG. 5 is a side elevation view illustrating one embodiment of the present invention in which a multi-layered, distributed phosphor scintillator structure is employed. The scintillator body 10 comprises a number of layers. A first layer 10a comprises a phosphor either in powdered or crystalline form, or even in a form of a phosphor powder suspended in a transparent matrix. A second layer 10b comprises a relatively optically transparent substrate. A third layer 10c comprises transparent laminate material and forms the principal channel through which light generated within the scintillator body 10 is transmitted unattenuated to the detectors 18. Here a high energy photon 51 from x-ray beam 50 impinges upon an absorption site 32 thereby generating optical wavelength photons. A typical path of one such photon being illustrated by light path 34. Again, a horizontal collimator member 40 is added, if desired, to enhance the vertical resolution. Both sides of this horizontal collimator 40 are coated with a suitably reflective material as described above. The scintillator body shown in FIG. 5 is more particularly described in the application of Cusano et al, Ser. No. 853,086, filed Nov. 21, 1977.

FIG. 6 shows another embodiment of the present invention in which the scintillator body 10 is made from a single crystal or other single relatively homogeneous scintillator material. A supportive filler 11 is also added, if desired. This filler 11 need to be only nonabsorptive of high energy photons and transparent to the optical output of the scintillator body 10. Again a typical light path 34 is shown.

FIG. 7 is similar to the structure shown in FIG. 1 except that here the photodetectors employed are disposed in modular segments. As shown, modular photodetectors 42 each comprising a plurality of individual detectors 43 are fabricated with a single common contact lead 19a for all of the individual detectors in a modular segment. In this modular photodetector construction, each of the individual detectors 43 is provided with a single contact lead 19b of its own. This modular format therefore reduces the wiring space requirements and facilitates fabrication. The modular photodetector units are assembled on a printed circuit substrate 41.

Figure 8:
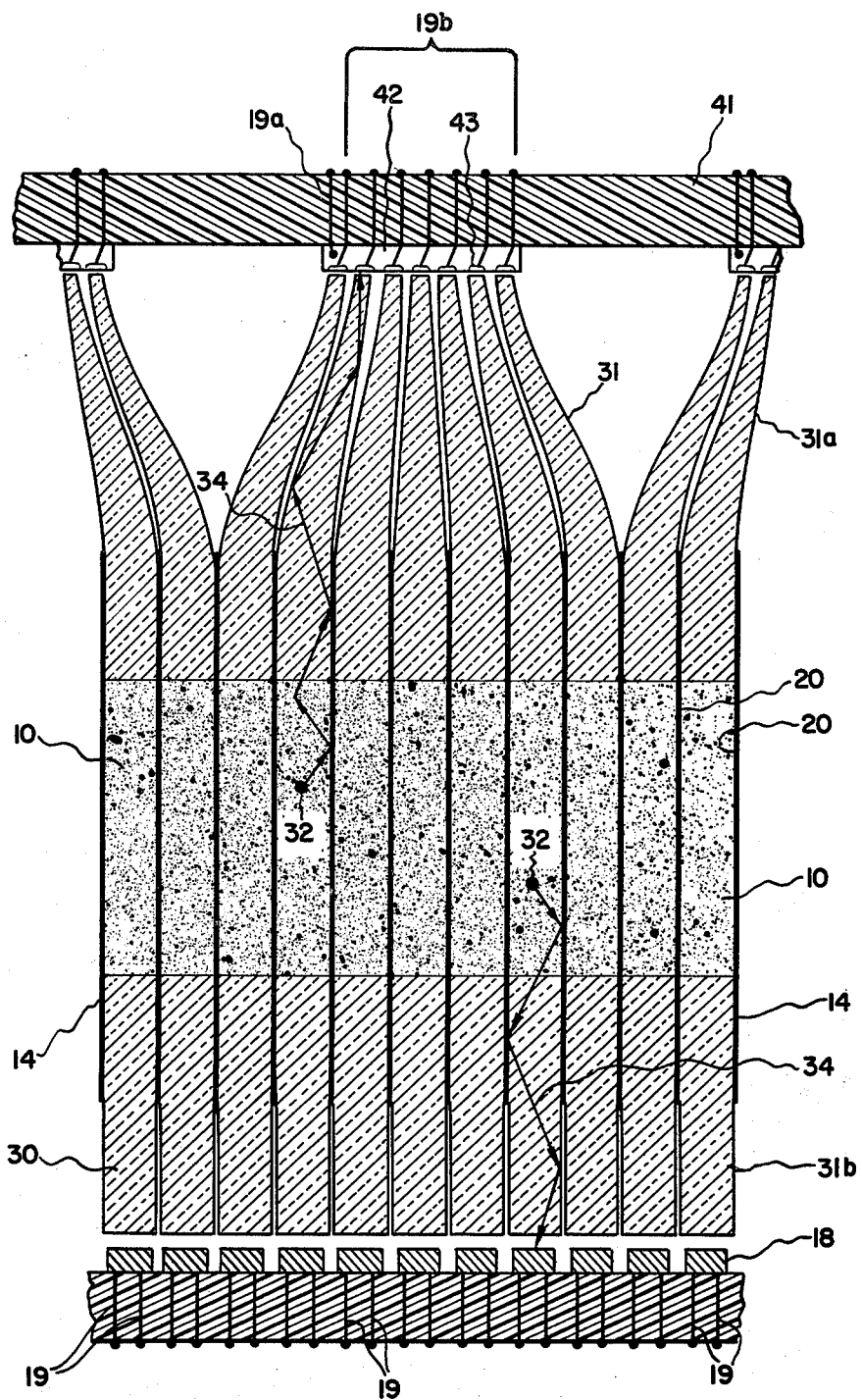
FIG. 8 is a rear sectional elevational view illustrating the use of fiber optics to channel light from the scintillator body to the photoelectrically responsive detectors.

FIG. 8 is similar to FIG. 3 except that here the optical output of the scintillator, as typified by light paths 34, is directed to photodetectors 18 or 43 by means of fiber optic materials. The upper portion of FIG. 8 illustrates the use of fiber optic light concentrating materials 31a which direct the optical output 34 to individual photodetectors 43 in a modular segment 42. The lower portion of FIG. 8 illustrates the use of non-concentrating, direct fiber optic links 31b from the scintillator bodies 10 to the photodetectors 18 mounted on printed circuit board 41. As can be seen, the concentrating fiber optic means provide for greater flexibility in the placement of the photodetectors.

Figure 9:
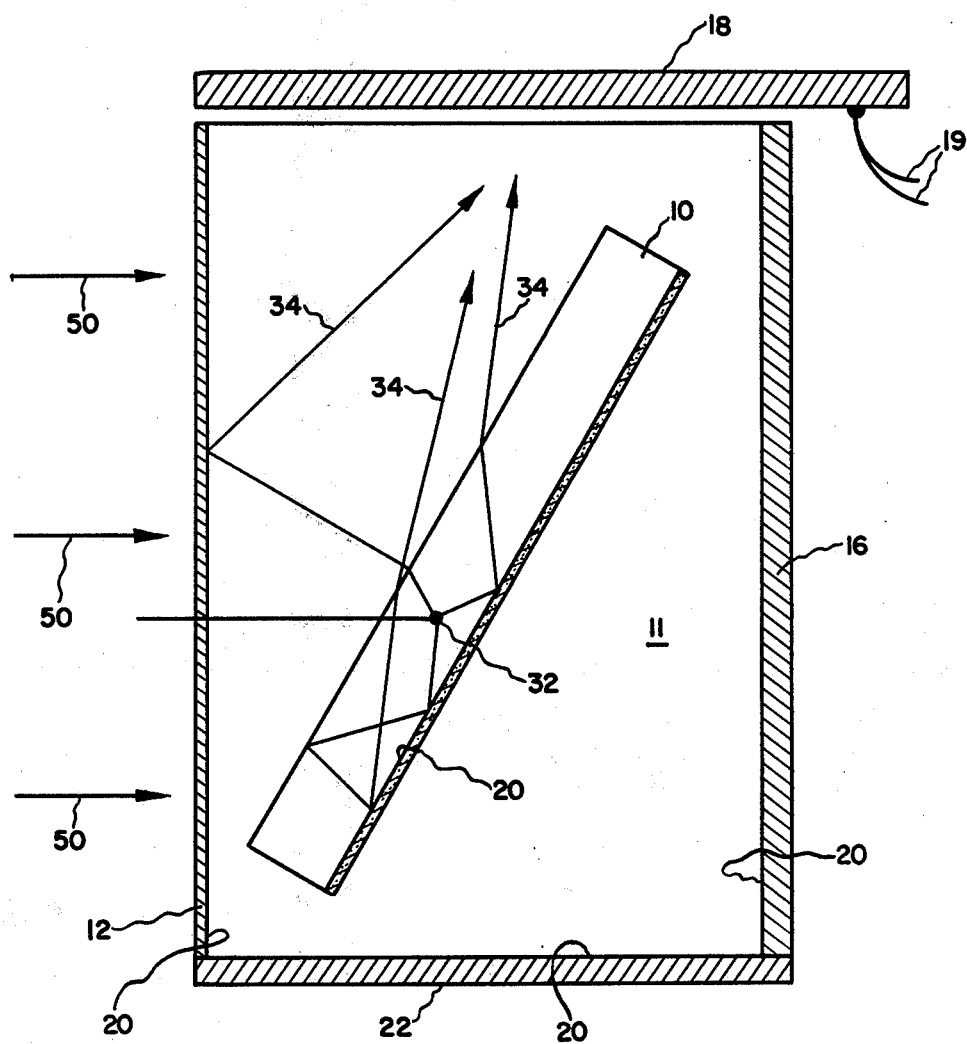
FIG. 9 is a side sectional elevation view illustrating one embodiment of the present invention in which the scintillator body is angled and reflectively coated.

FIG. 9 describes another embodiment of the present invention in which the scintillator body itself is provided with a rear reflective coating 20 and angled so as to direct its optical output, as typified by light paths 34, in a preferred direction. In this embodiment, only a single detector 18 may be provided for each detector cell. This detector is placed on that detector array wall favored by the tilt of the scintillator body. The scintillator body itself is supported within the cell by transparent medium 11 which is non-absorptive of high energy electromagnetic photons. This particular structure is advantageous in that an entire side of expensive photodetectors is eliminated with only a minimal impact on overall efficiency.

It can be appreciated from the above description that the present invention provides several advantages over scintillation detectors in which the present invention is not employed. In particular there is improved channeling of the optical output of the scintillator material to photoelectrically responsive detectors. There is also the removal of the photoelectrically responsive detector from the direct beam of the high energy x-ray or gamma-rays, a result of which is the removal of a major source of detector degradation. In addition, the placement of the photoelectrically responsive detectors above and below the x-ray beam provides for the greater area of detector for the detection of the optical output. This greater area enhances the overall efficiency of the system. Finally, the placement of the detectors in the present invention along with the inclusion of horizontal collimator member 40 provides for a greater vertical resolution if this is desired. In fact, in the context of computerized tomographic x-ray imaging, the collimated scintillation detector disclosed herein with the addition of the horizontal collimator 40 produces a sufficient amount of data to permit the construction of two images of bodily slices rather than just a single slice image.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:

1. A scintillation detector for use in computerized tomography comprising:
    a front wall member with an internal and external surface, said front wall member being substantially transparent to supra-optical electromagnetic radiation and having its internal surface coated with an optically reflective material;
    a rear wall member with an internal surface and an external surface, said rear wall member being substantially parallel to said front wall member and having its internal surface coated with an optically reflective material;
    at least three collimator wall members oriented substantially perpendicular to said front and rear wall members, said collimator members being substantially impervious to supra-optical electromagnetic radiation, said collimator and wall members defining a plurality of cells with open ends and said collimator members having all surfaces facing the interior of said cells, coated with an optically reflective material;

at least one scintillator body in each of said cells; and a plurality of photoelectrically responsive detector means each of which is disposed so as to receive optical radiation emitted by the scintillator material in a single cell so as to produce an electrical signal representative of the intensity of the spura-optical electromagnetic radiation impinging upon each of said cells.

2. The scintillator detector of claim 1 in which the coating material is silver.

3. The scintillator detector of claim 1 in which the coating is of a material selected from the group consisting of barium sulfate and magnesium oxide.

4. The scintillation detector of claim 1 in which there is a photoelectrically responsive detector aligned with and substantially covering the open ends of each cell, whereby two photoelectrically responsive detectors are associated with each cell.

5. The scintillator detector of claim 1 in which there is associated with each cell a single photoelectrically responsive detector, said detector aligned with and substantially covering the open end of the cell, said detectors being arranged in an alternating pattern and further comprising:

reflective top and bottom wall members aligned with and substantially covering the alternating cell ends not covered by photoelectrically responsive detectors.

6. The scintillator detector of claim 1 in which the photoelectrically responsive detector means are silicon photodiodes.

7. The scintillation detector of claim 6 in which the detectors are formed from a modular unit comprising a plurality of silicon photodiodes.

8. The scintillation detector of claim 1 further comprising:

a separating wall member substantially impervious to supra-optical electromagnetic radiation, said separating wall member being oriented substantially perpendicular to both the collimator wall members and the front and rear wall members and being coated on both sides thereof with an optically reflective material, and being located so as to approximately bisect the collimator members and said front and rear wall members, whereby the number of cells is doubled and the resolution is increased.

9. The scintillation detector of claim 1 further comprising:

at least one prismatic wedge member in each cell, said wedge members being coated with an optically reflective material and being located along the edges of the cell that are substantially perpendicular to the front and rear wall members, whereby the optical output scintillator body is channeled to an area smaller than the cell opening.

10. The scintillator detector of claim 1 in which the detector means are located at the open ends of the cells, whereby the detector means are removed from direct high energy photon bombardment.

11. The scintillation detector of claim 1 in which the collimator wall members extend through the front wall member.

12. The scintillation detector of claim 1 further comprising:

fiber optical means directing the optical scintillator output to the detector means.

* * * * *